(12) United States Patent
Vuong et al.

(10) Patent No.: US 7,523,021 B2
(45) Date of Patent: Apr. 21, 2009

(54) WEIGHTING FUNCTION TO ENHANCE MEASURED DIFFRACTION SIGNALS IN OPTICAL METROLOGY

(75) Inventors: Vi Vuong, Fremont, CA (US); Junwei Bao, Palo Alto, CA (US); Shifang Li, Pleasanton, CA (US); Yan Chen, Santa Clara, CA (US)

(73) Assignee: Tokyo Electron Limited, Tokyo (JP)

( * ) Notice: Subject to any disclaimer, the term of this patent is extended or adjusted under 35 U.S.C. 154(b) by 400 days.

(21) Appl. No.: 11/371,752

(22) Filed: Mar. 8, 2006

(65) Prior Publication Data

US 2007/0211260 A1    Sep. 13, 2007

(51) Int. Cl.
- *G01B 11/02* (2006.01)
- *G06F 19/00* (2006.01)
- *H03F 1/26* (2006.01)
- *H04B 15/00* (2006.01)

(52) U.S. Cl. .................. 702/194; 356/625; 702/181; 702/189

(58) Field of Classification Search .................. 702/30, 702/189, 181, 194; 356/39, 73, 326, 400, 356/601, 625; 700/110; 250/559.45; 385/27
See application file for complete search history.

(56) References Cited

U.S. PATENT DOCUMENTS

| | | | |
|---|---|---|---|
| 5,525,808 A | 6/1996 | Irie et al. | |
| 6,785,638 B2 | 8/2004 | Niu et al. | |
| 6,891,626 B2 | 5/2005 | Niu et al. | |
| 6,943,900 B2 * | 9/2005 | Niu et al. ................... | 356/625 |
| 7,092,110 B2 | 8/2006 | Balasubramanian et al. | |
| 2004/0267397 A1 | 12/2004 | Doddi | |
| 2005/0060103 A1 | 3/2005 | Chamness | |

OTHER PUBLICATIONS

U.S. Appl. No. 11/349,773, filed Feb. 7, 2006, Vuong.
User Guide to SIMCA-P 8.0: A new standard in multivariate data analysis, Umetrics AB, May 17, 2005.
Vuong, Vi. et al. U.S. Appl. No. 11/349,773, filed Feb. 7, 2006.
International Search Report and Written Opinion mailed Jul. 3, 2008, for PCT Application No. PCT/US07/05573 filed Mar. 5, 2007, 7 pages.

* cited by examiner

*Primary Examiner*—John H Le
(74) *Attorney, Agent, or Firm*—Morrison & Foerster LLP (57) ABSTRACT

A weighting function is obtained to enhance measured diffraction signals used in optical metrology. To obtain the weighting function, a measured diffraction signal is obtained. The measured diffraction signal was measured from a site on a wafer using a photometric device. A first weighting function is defined based on noise that exists in the measured diffraction signal. A second weighting function is defined based on accuracy of the measured diffraction signal. A third weighting function is defined based on sensitivity of the measured diffraction signal. A fourth weighting function is defined based on one or more of the first, second, and third weighting functions.

18 Claims, 6 Drawing Sheets

WEIGHTING FUNCTION TO ENHANCE MEASURED DIFFRACTION SIGNALS IN OPTICAL METROLOGY

BACKGROUND

1. Field

The present application relates to optical metrology, and, more particularly, to defining a weighting function to enhance measured diffraction signals used in optical metrology.

2. Related Art

Optical metrology involves directing an incident beam at a feature on a wafer, measuring the resulting diffraction signal, and analyzing the measured diffraction signal to determine various characteristics of the feature. In semiconductor manufacturing, optical metrology is typically used for quality assurance. For example, after fabricating a periodic grating in proximity to a semiconductor chip on a semiconductor wafer, an optical metrology system is used to determine the profile of the periodic grating. By determining the profile of the periodic grating, the quality of the fabrication process utilized to form the periodic grating, and by extension the semiconductor chip proximate the periodic grating, can be evaluated.

For a number of reasons, the measured diffraction signal may be weak. For example, the measured diffraction signal may include noise related to the hardware used to obtain the measured diffraction signal and to the feature being measured. A weak measured diffraction signal may decrease the accuracy of the optical metrology process.

SUMMARY

In one exemplary embodiment, a weighting function is obtained to enhance measured diffraction signals used in optical metrology. To obtain the weighting function, a measured diffraction signal is obtained. The measured diffraction signal was measured from a site on a wafer using a photometric device. A first weighting function is defined based on noise that exists in the measured diffraction signal. A second weighting function is defined based on accuracy of the measured diffraction signal. A third weighting function is defined based on sensitivity of the measured diffraction signal. A fourth weighting function is defined based on one or more of the first, second, and third weighting functions.

DESCRIPTION OF DRAWING FIGURES

The present application can be best understood by reference to the following description taken in conjunction with the accompanying drawing figures, in which like parts may be referred to by like numerals.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

1. Optical Metrology

Figure 1:
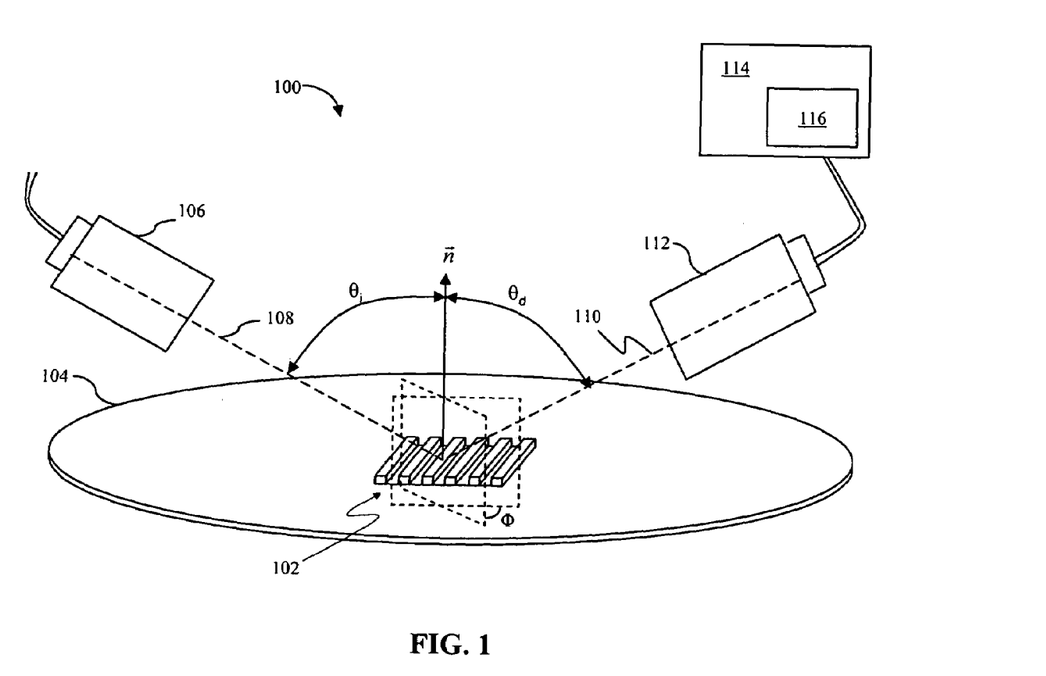
FIG. 1 depicts an exemplary optical metrology system.

With reference to FIG. 1, an optical metrology system 100 can be used to examine and analyze a structure formed on a wafer. For example, optical metrology system 100 can be used to determine the profile of a periodic grating 102 formed on wafer 104. As described earlier, periodic grating 102 can be formed in test areas on wafer 104, such as adjacent to a device formed on wafer 104. Alternatively, periodic grating 102 can be formed in an area of the device that does not interfere with the operation of the device or along scribe lines on wafer 104.

As depicted in FIG. 1, optical metrology system 100 can include a photometric device with a source 106 and a detector 112. Periodic grating 102 is illuminated by an incident beam 108 from source 106. In the present exemplary embodiment, incident beam 108 is directed onto periodic grating 102 at an angle of incidence $\theta_i$ with respect to normal $\vec{n}$ of periodic grating 102 and an azimuth angle $\Phi$ (i.e., the angle between the plane of incidence beam 108 and the direction of the periodicity of periodic grating 102). Diffracted beam 110 leaves at an angle of $\theta_d$ with respect to normal $\vec{n}$ and is received by detector 112. Detector 112 converts the diffracted beam 110 into a measured diffraction signal.

To determine the profile of periodic grating 102, optical metrology system 100 includes a processing module 114 configured to receive the measured diffraction signal and analyze the measured diffraction signal. The profile of periodic grating 102 can then be determined using a library-based optical metrology process or a regression-based optical metrology process. Additionally, other linear or non-linear profile extraction techniques are contemplated.

It should be recognized that optical metrology system 100 can be used to examine and analyze various types of structures other than periodic grating 102, such as a thin film layer, features of the actual device, and the like. Additionally, a library-based optical metrology process or a regression-based optical metrology process can be used to determine various characteristics other than profile, such as the thickness of a thin film layer.

2. Library-Based Optical Metrology Process

In a library-based optical metrology process, the measured diffraction signal is compared to a library of simulated diffraction signals. More specifically, each simulated diffraction signal in the library is associated with an optical metrology model of the feature. When a match is made between the measured diffraction signal and one of the simulated diffraction signals in the library or when the difference of the measured diffraction signal and one of the simulated diffraction signals is within a preset or matching criterion, the optical metrology model associated with the matching simulated diffraction signal is presumed to represent the feature. The matching simulated diffraction signal and/or optical metrology model can then be utilized to determine whether the feature has been fabricated according to specifications.

Thus, with reference again to FIG. 1, in one exemplary embodiment, after obtaining a measured diffraction signal, processing module 114 then compares the measured diffraction signal to simulated diffraction signals stored in a library 116. Each simulated diffraction signal in library 116 can be associated with an optical metrology model. Thus, when a match is made between the measured diffraction signal and one of the simulated diffraction signals in library 116, the optical metrology model associated with the matching simulated diffraction signal can be presumed to represent the actual profile of periodic grating 102.

The set of optical metrology models stored in library 116 can be generated by characterizing the profile of periodic grating 102 using a set of profile parameters, then varying the set of profile parameters to generate optical metrology models of varying shapes and dimensions. The process of characterizing a profile using a set of profile parameters can be referred to as parameterizing.

Figure 2A:
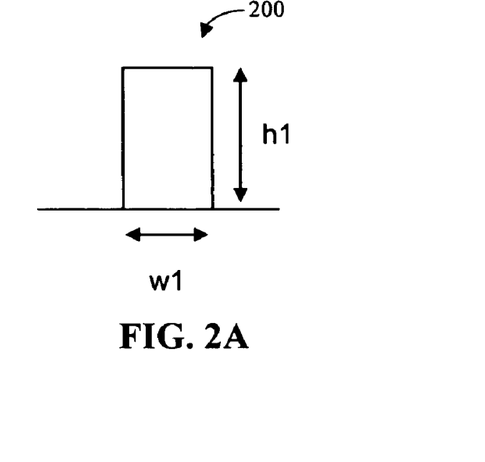
FIGS. 2A-2E depict various optical metrology models of a structure.
Figure 2B:
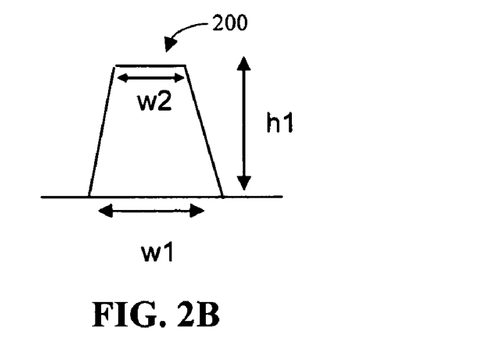
Figure 2C:
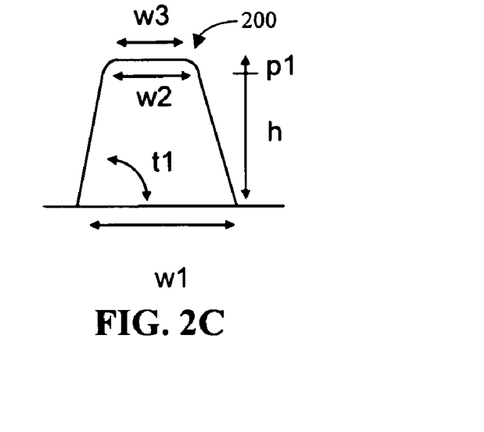
Figure 2D:
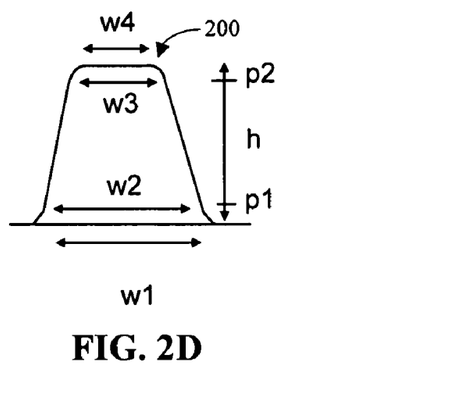
Figure 2E:
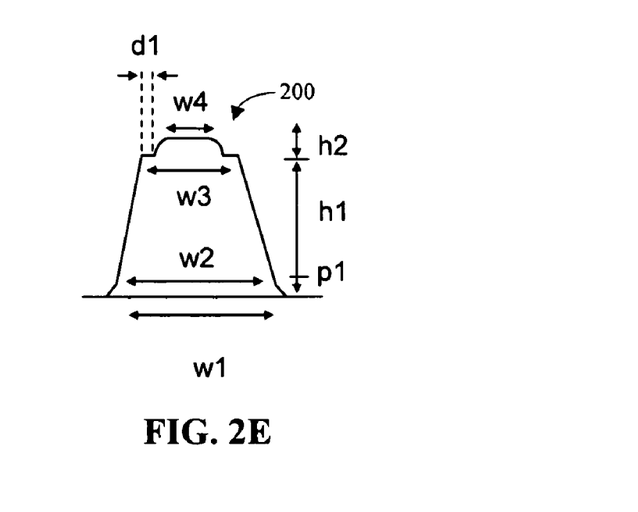

For example, as depicted in FIG. 2A, assume that the profile of a feature is characterized using optical metrology model 200 with profile parameters h1 and w1 that define its height and width, respectively. As depicted in FIGS. 2B to 2E, additional shapes and features of the profile can be characterized by increasing the number of profile parameters used in optical metrology model 200. For example, as depicted in FIG. 2B, optical metrology model 200 can include profile parameters h1, w1, and w2 that define its height, bottom width, and top width, respectively. Note that the width of optical metrology model 200 can be referred to as the critical dimension (CD). For example, in FIG. 2B, profile parameter w1 and w2 can be described as defining the bottom CD and top CD, respectively, of optical metrology model 200.

As described above, the set of optical metrology models stored in library 116 (FIG. 1) can be generated by varying the profile parameters used in the optical metrology model. For example, with reference to FIG. 2B, by varying profile parameters h1, w1, and w2, optical metrology models of varying shapes and dimensions can be generated. Note that one, two, or all three profile parameters can be varied relative to one another.

With reference again to FIG. 1, the number of optical metrology models and corresponding simulated diffraction signals in the set of optical metrology models and simulated diffraction signals stored in library 116 (i.e., the resolution and/or range of library 116) depends, in part, on the range over which the set of profile parameters and the increment at which the set of profile parameters are varied. In one exemplary embodiment, the optical metrology models and the simulated diffraction signals stored in library 116 are generated prior to obtaining a measured diffraction signal from an actual feature. Thus, the range and increment (i.e., the range and resolution) used in generating library 116 can be selected based on familiarity with the fabrication process for a feature and what the range of variance is likely to be. The range and/or resolution of library 116 can also be selected based on empirical measures, such as measurements using AFM, X-SEM, and the like.

For a more detailed description of a library-based process, see U.S. patent application Ser. No. 09/907,488, titled GENERATION OF A LIBRARY OF PERIODIC GRATING DIFFRACTION SIGNALS, filed on Jul. 16, 2001, which is incorporated herein by reference in its entirety.

3. Regression-Based Optical Metrology Process

In a regression-based optical metrology process, the measured diffraction signal is compared to a simulated diffraction signal (i.e., a trial diffraction signal). The simulated diffraction signal is generated prior to the comparison using a set of profile parameters (i.e., trial profile parameters) for an optical metrology model. If the measured diffraction signal and the simulated diffraction signal do not match or when the difference of the measured diffraction signal and one of the simulated diffraction signals is not within a preset or matching criterion, another simulated diffraction signal is generated using another set of profile parameters for another optical metrology model, then the measured diffraction signal and the newly generated simulated diffraction signal are compared. When the measured diffraction signal and the simulated diffraction signal match or when the difference of the measured diffraction signal and one of the simulated diffraction signals is within a preset or matching criterion, the optical metrology model associated with the matching simulated diffraction signal is presumed to represent the actual feature. The matching simulated diffraction signal and/or optical metrology model can then be utilized to determine whether the feature has been fabricated according to specifications.

Thus, with reference again to FIG. 1, in one exemplary embodiment, processing module 114 can generate a simulated diffraction signal for an optical metrology model, and then compare the measured diffraction signal to the simulated diffraction signal. As described above, if the measured diffraction signal and the simulated diffraction signal do not match or when the difference of the measured diffraction signal and one of the simulated diffraction signals is not within a preset or matching criterion, then processing module 114 can iteratively generate another simulated diffraction signal for another optical metrology model. In one exemplary embodiment, the subsequently generated simulated diffraction signal can be generated using an optimization algorithm, such as global optimization techniques, which includes simulated annealing, and local optimization techniques, which includes steepest descent algorithm.

In one exemplary embodiment, the simulated diffraction signals and optical metrology models can be stored in a library 116 (i.e., a dynamic library). The simulated diffraction signals and optical metrology models stored in library 116 can then be subsequently used in matching the measured diffraction signal.

For a more detailed description of a regression-based process, see U.S. patent application Ser. No. 09/923,578, titled METHOD AND SYSTEM OF DYNAMIC LEARNING THROUGH A REGRESSION-BASED LIBRARY GENERATION PROCESS, filed on Aug. 6, 2001, now U.S. Pat. No. 6,785,638, issued Aug. 31, 2004, which is incorporated herein by reference in its entirety.

4. Rigorous Coupled Wave Analysis

As described above, simulated diffraction signals are generated to be compared to measured diffraction signals. In one exemplary embodiment, simulated diffraction signals can be generated by applying Maxwell's equations, which can be solved using various numerical analysis techniques, including rigorous coupled-wave analysis (RCWA). For a more detailed description of RCWA, see U.S. patent application Ser. No. 09/770,997, titled CACHING OF INTRA-LAYER CALCULATIONS FOR RAPID RIGOROUS COUPLED-WAVE ANALYSES, filed on Jan. 25, 2001, now U.S. Pat. No. 6,891,626, issued May 10, 2005, which is incorporated herein by reference in its entirety.

5. Machine Learning Systems

In one exemplary embodiment, simulated diffraction signals can be generated using a machine learning system employing a machine learning algorithm, such as back-propagation, radial basis function, support vector, kernel regression, and the like. For a more detailed description of machine learning systems and algorithms, see "Neural Networks" by Simon Haykin, Prentice Hall, 1999, which is incorporated herein by reference in its entirety. See also U.S. patent application Ser. No. 10/608,300, titled OPTICAL METROLOGY OF STRUCTURES FORMED ON SEMICONDUCTOR WAFERS USING MACHINE LEARNING SYSTEMS, filed on Jun. 27, 2003, which is incorporated herein by reference in its entirety.

6. Weighting Function

With reference again to FIG. 1, as described above, a photometric device, which includes source 106 and detector 112, can be used to generate a measured diffraction signal from a feature on wafer 104. For a number of reasons, the measured diffraction signal may be weak, which can reduce the accuracy of the optical metrology process.

Thus, in one exemplary embodiment, a weighting function is defined to enhance the measured diffraction signal. In particular, a measured diffraction signal is obtained from a feature to be examined. The weighting function and the measured diffraction signal are multiplied to produce an enhanced measured diffraction signal. The enhanced measured diffraction signal is then used in the optical metrology process to increase the accuracy of the optical metrology process.

In one exemplary embodiment, a weighting function is defined based on the noise that exists in obtaining the measured diffraction signal using the photometric device. The noise can be related to the hardware used to obtain the measured diffraction signal, such as the optics and electronics used in the photometric device. The noise can also be related to the feature being measurement, such as the phenomenon of resist bleaching resulting from the source.

Figure 3:
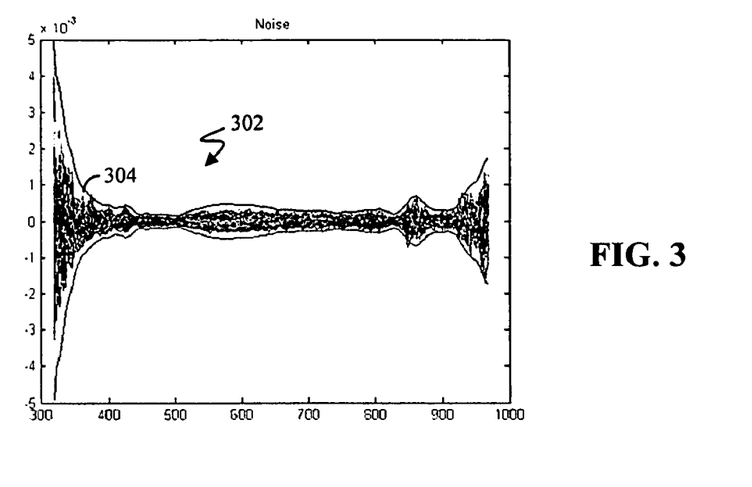
FIG. 3 depicts an exemplary noise profile.

With reference to FIG. 3, in the present exemplary embodiment, to define a weighting function based on noise, a noise profile 302 is first generated. In particular, a set of measured diffraction signals are obtained. The set of measured diffraction signals can be obtained in advance from a single site on a wafer using the photometric device. Note, the site from which the set of measured diffraction signal are obtained can be on a different wafer than the wafer on which the feature to be examined is formed.

An average measured diffraction signal is calculated from the set of measured diffraction signals. Noise profile 302 is the difference between each of the measured diffraction signals and the average measured diffraction signal. Noise profile 302 depicted in FIG. 3 was calculated from 50 measured diffraction signals. It should be recognized, however, that any number of measured diffraction signals can be obtained to generate a noise profile. Because noise profile 302 is generated from measured diffraction signals, noise profile 302 takes into account noise resulting from both hardware related noise and feature related noise.

After noise profile 302 is obtained, a noise envelope 304 is defined based on noise profile 302. In the present exemplary embodiment, noise envelope 304 is defined using maximum values of noise profile 302 and a curve smoothing technique. It should be recognized, however, that noise envelope 304 can be defined using various numerical techniques.

Figure 4:
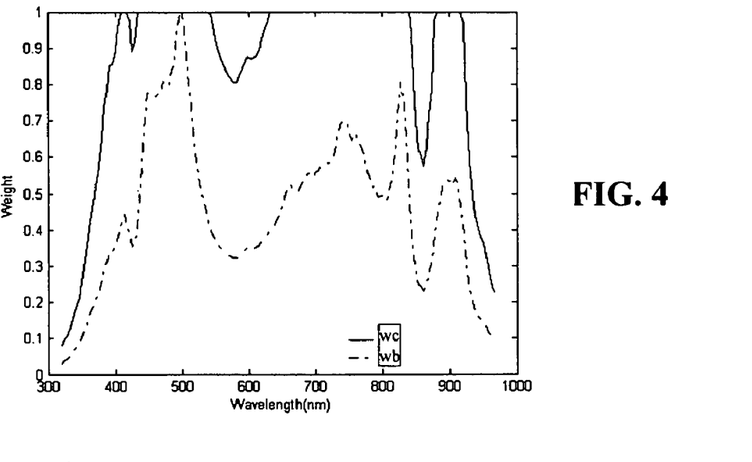
FIG. 4 depicts exemplary weighting functions.

With reference to FIG. 4, in the present exemplary embodiment, a weighting function wb is defined by inverting noise envelope 304 (FIG. 3). Weighting function wb can be modified to generate additional weighting functions. For example, weighting function wc is generated by scaling and truncating weighting function wb.

Figure 5:
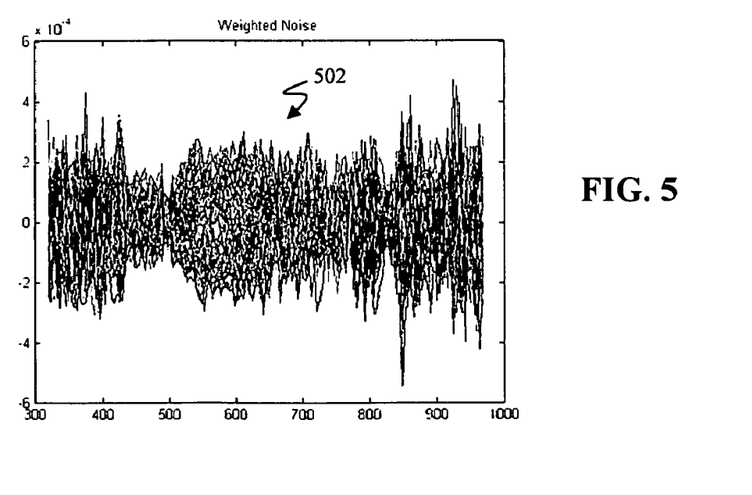
FIG. 5 depicts another exemplary noise profile.

FIG. 5 depicts a noise profile 502 generated by enhancing noise profile 302 (FIG. 3) using weighting function wc (FIG. 4). In particular, noise profile 302 (FIG. 3) is multiplied by weighting function wc (FIG. 4) to generate noise profile 502. As depicted in FIG. 5, weighting function wc reduces the amount of noise and increases the uniformity of noise profile 502. Note, however, that weighting function wc does not entirely eliminate noise. Completely eliminating noise can degrade the measured diffraction signal, which can reduce accuracy of the optical metrology process.

Thus, in the present exemplary embodiment, the weighting function is modified to remove the desired amount of noise from the measured diffraction signal without overly degrading the measured diffraction signal. Additionally, the weighting function can be modified to shape the amount of noise reduction of a measured diffraction signal. For example, the weighting function can be modified to reduce less noise at one portion of a measured diffraction signal compared to another portion of the measured diffraction signal.

Figure 6:
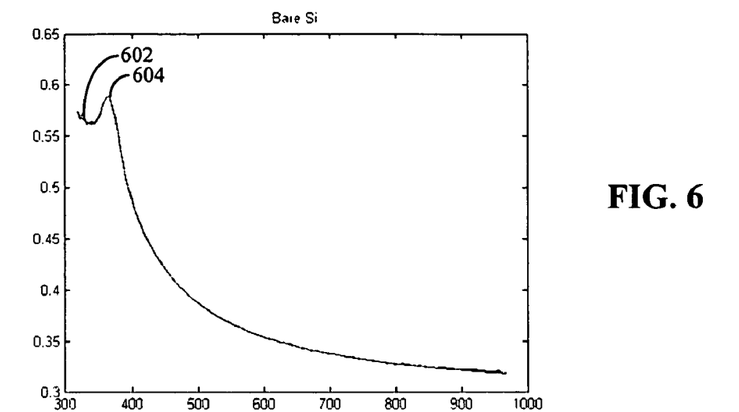
FIG. 6 depicts an exemplary measured diffraction signal and an exemplary simulated diffraction signal.

In another exemplary embodiment, a weighting function is defined based on measurement accuracy. In particular, a measured diffraction signal is obtained. The measured diffraction signal can be obtained in advance from a site on a reference wafer using the photometric device. Note, the site from which the set of measured diffraction signal is obtained can be on a different wafer than the wafer on which the feature to be examined is formed. For example, FIG. 6 depicts a measured diffraction signal 602 obtained from a reference wafer with a bare silicon layer, which is a thin film and not patterned.

In the present exemplary embodiment, a simulated diffraction signal is obtained for the site on the reference wafer from where the measured diffraction signal was obtained. As described above, the simulated diffraction signal can be obtained using various numerical techniques, such as RCWA, or an MLS system. For example, FIG. 6 depicts a simulated diffraction signal 604 for the bare silicon layer.

Figure 7:
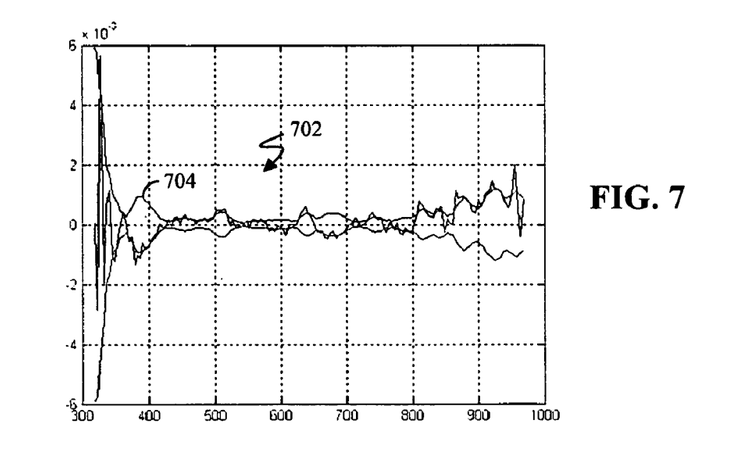
FIG. 7 depicts an exemplary error profile.

In the present exemplary embodiment, an error profile is generated based on the measured and simulated diffraction signals. For example, FIG. 7 depicts an error profile 702 generated based on the difference between the measured and simulated diffraction signals depicted in FIG. 6.

Figure 8:
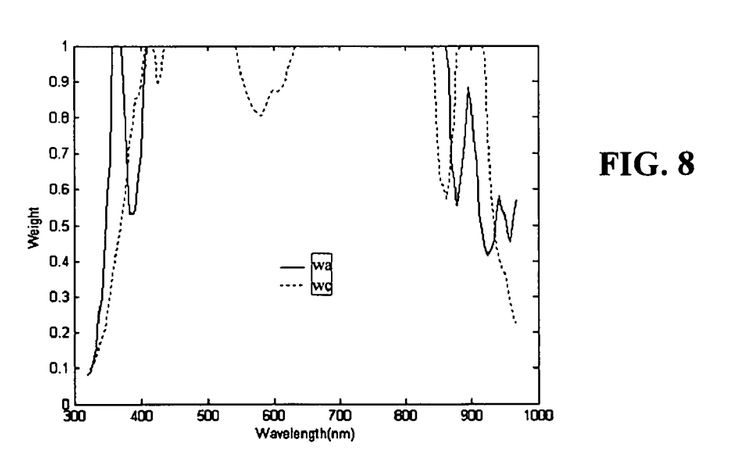
FIG. 8 depicts an exemplary weighting function.

An error envelope 704 is defined for the error profile 702. A weighting function can be defined based on error envelope 704. For example, FIG. 8 depicts a weighting function wa defined by inverting error envelope 704. It should be recognized that additional weighting functions can be generated by modifying weighting function wa.

In another exemplary embodiment, a weighting function is defined based on sensitivity of the measured diffraction signal. In particular, a set of measured or simulated diffraction signals are obtained with known variations in one or more process parameters (i.e., characteristics of the manner in which the structure being examined will be fabricated). For example, a set of measured or simulated diffraction signals can be obtained with known variations in exposure dose, dose, temperature, material properties, and the like.

As will be described in more detail below, in the present exemplary embodiment, one or more essential variables are obtained for the set of measured or simulated diffraction signals using multivariate analysis. The measured diffraction signal is transformed into a transformed diffraction signal using the one or more essential variables. A weighting function can be defined based on the transformed diffraction signal and the measured diffraction signal. In particular, the weighting function can be defined as the ratio of the transformed diffraction signal to the measured diffraction signal.

Figure 9:
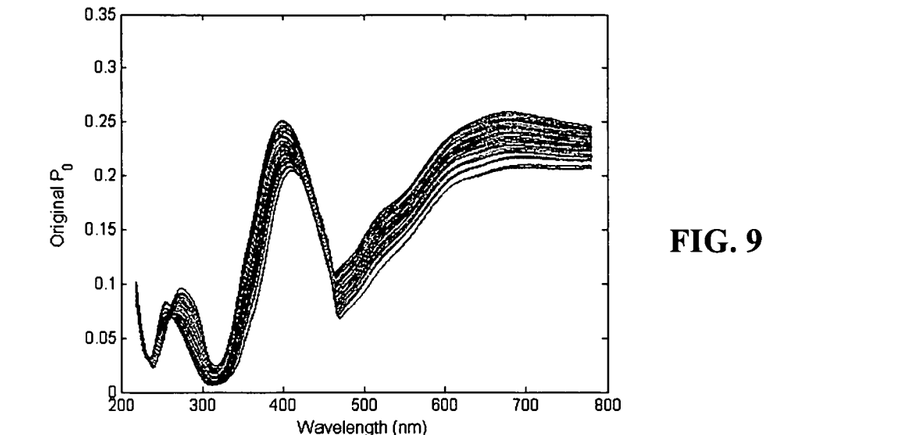
FIG. 9 depicts a set of measured diffraction signals.
Figure 10:
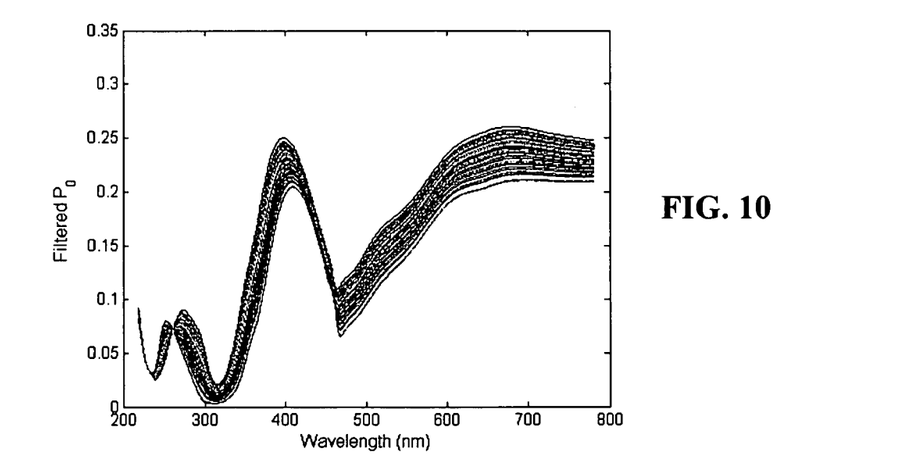
FIG. 10 depicts a set of transformed diffraction signals.
Figure 11:
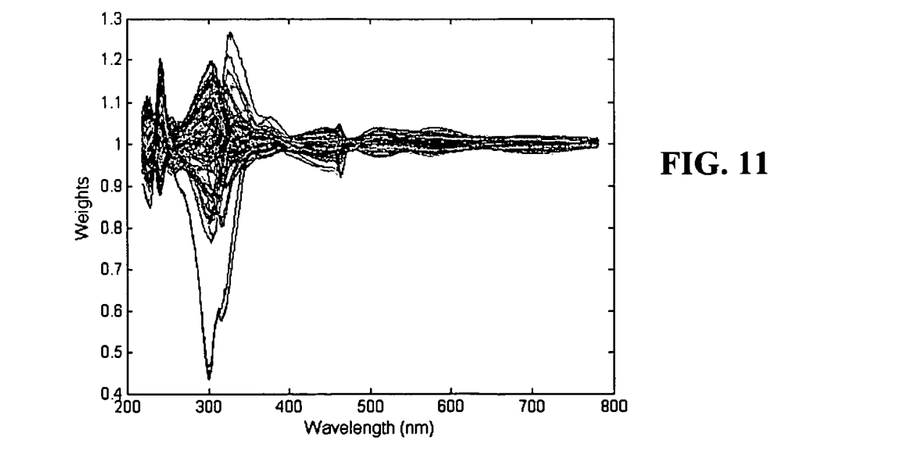
FIG. 11 depicts ratios of the transformed diffractions signals depicted in FIG. 10 and the measured diffraction signals depicted in FIG. 9.

It should be recognized that a plurality of weighting functions can be defined based on a set of transformed diffraction signals and measured diffraction signals. For example, FIG. 9 depicts a set of measured diffraction signals. FIG. 10 depicts a set of transformed diffraction signals that resulted from applying one or more essential variables to the set of measured diffraction signals. FIG. 11 depicts the weighting functions determined based on the set of transformed diffraction signals depicted in FIG. 10 and the set of measured diffraction signals depicted in FIG. 9. In particular, the weight functions depicted in FIG. 11 are ratios of the set of transformed diffraction signals depicted in FIG. 10 and the set of measured diffraction signals depicted in FIG. 9. Moreover, one weight function depicted in FIG. 11 is a ratio of one transformed diffraction signal depicted in FIG. 10 and one measured diffraction signal depicted in FIG. 9, which was used to generate the transformed diffraction signal depicted in FIG. 10.

As described above, multivariate analysis can be used to determine one or more essential variables for the set of measured or simulated diffraction signals. In particular, a set of measured diffraction signals can be obtained from actual measurements from an actual semiconductor fabrication process used to form the structure being examined on wafers. Alternatively, a set of simulated diffraction signals can be obtained using simulations of the fabrication process to form the structure being examined on wafers.

The set of measured or simulated diffraction signals comprising light intensity as a function of wavelength for each set of process parameters can be recorded and stored as a data matrix $\overline{X}$. For example, each row in the matrix $\overline{X}$ corresponds to a diffraction signal (light intensity versus wavelength) for a given variation in a process parameter. Thus, the different rows of the matrix $\overline{X}$ correspond to different diffraction signals for different variations in the process parameter. Each column in the matrix $\overline{X}$ corresponds to a specific wavelength in the diffraction signals. Hence, a matrix $\overline{X}$ assembled from the set of measured or simulated diffraction signals has the dimensions m by n, where, for example, m is the number of measurements and n is the number of wavelengths.

In one exemplary embodiment, statistical data calculations can be performed on the set of measured or simulated diffraction signals. For example, the data stored in the matrix $\overline{X}$ can be mean-centered and/or normalized, if desired. Centering the data stored in a matrix column involves computing the mean value of the column elements and subtracting it from each element. Moreover, the data residing in a column of the matrix can be normalized by the standard deviation of the data in the column. Furthermore, the centering coefficients and/or normalization coefficients may be updated following each acquisition of new measured or simulated diffraction signals. For further details, see U.S. patent application Ser. No. 10/660,697, filed Sep. 12, 2003, titled METHOD AND SYSTEM OF DIAGNOSING A PROCESSING SYSTEM USING ADAPTIVE MULTIVARIATE ANALYSIS, which is incorporated herein by reference in its entirety. It should be recognized that the step of performing statistical data calculations can be omitted in some applications.

In one exemplary embodiment, multivariate analysis is used to determine the extent to which variations in process parameters contribute to change in the measured or simulated diffraction signals. For example, to determine the inter-relationships between variations in process parameters and measured or simulated diffraction signals, the matrix $\overline{X}$ is subject to multivariate analysis.

In one exemplary embodiment, principal components analysis (PCA) is employed to derive a correlation structure within matrix $\overline{X}$ by approximating matrix $\overline{X}$ with a matrix product $(\overline{TP^T})$ of lower dimensions plus an error matrix $\overline{E}$:

$$\overline{X} = \overline{TP^T} + \overline{E}, \quad (1)$$

where $\overline{T}$ is a (m by p) matrix of scores that summarizes the $\overline{X}$-variables and $\overline{P}$ is a (n by p, where $p \leq n$) matrix of loadings showing the influence of the variables. It should be recognized that various types of multivariate analysis can be performed, such as independent component analysis, cross correlation analysis, linear approximation analysis, and the like.

In general, the loadings matrix $\overline{P}$ can be shown to comprise the eigenvectors of the covariance matrix of $\overline{X}$, where the covariance matrix $\overline{S}$ can be shown to be:

$$\overline{S} = \overline{X}^T \overline{X}. \quad (2)$$

The covariance matrix $\overline{S}$ is a real, symmetric matrix and, therefore, it can be described as:

$$\overline{S} = \overline{U \Lambda U^T}, \quad (3)$$

where the real, symmetric eigenvector matrix $\overline{U}$ comprises the normalized eigenvectors as columns and $\overline{\Lambda}$ is a diagonal matrix comprising the eigenvalues corresponding to each eigenvector along the diagonal.

Using equations (1) and (3) (for a full matrix of p=n; i.e. no error matrix), the following can be show:

$$\overline{P} = \overline{U} \quad (4)$$

and $$\overline{T}^T \overline{T} = \overline{\Lambda}. \quad (5)$$

A result of the above eigenanalysis is that each eigenvalue represents the variance of the measured or simulated diffraction signals in the direction of the corresponding eigenvector within n-dimensional space. Hence, the largest eigenvalue corresponds to the greatest variance in the measured or simulated diffraction signals within the n-dimensional space, while the smallest eigenvalue represents the smallest variance in the measured or simulated diffraction signals. By definition, all eigenvectors are orthogonal and, therefore, the second largest eigenvalue corresponds to the second greatest variance in the measured or simulated diffraction signals in the direction of the corresponding eigenvector which is normal to the direction of the first eigenvector.

In the present exemplary embodiment, one or more of the eigenvalues and eigenvectors from the multivariate analysis is selected as the one or more essential variables. The one or more essential variables can then be used to transform newly acquired measured diffraction signals to produce transformed diffraction signals.

In the present example, after performing PCA analysis, the loadings matrix $\overline{P}$ can be utilized to transform new measured diffraction signals into transformed diffraction signals by projecting the new measured diffraction signal onto the loadings matrix $\overline{P}$ (or set of principal components) to produce a set of scores (e.g., transformed diffraction signals).

In one embodiment, all of the eigenvectors (or principal components) (n) are utilized in the creation of the loadings matrix $\overline{P}$. In an another embodiment, a fraction (<n) of the eigenvectors (or principal components) are utilized in the creation of the loadings matrix $\overline{P}$. For example, the first three to four largest eigenvalues (and corresponding eigenvectors) are chosen to approximate the data and assemble the loadings matrix $\overline{P}$. As a result of the approximation, an error $\overline{E}$ is introduced to the representation in equation (1).

An example of commercially available software which supports PCA modeling is MATLAB, or another is SIMCA-P 8.0; for further details, see the User's Manual (*User Guide to SIMCA-P 8.0: A new standard in multivariate data analysis*, Umetrics A B, Version 8.0, September 1999). For additional description of determining essential variables, see U.S. patent application Ser. No. 11/349,773, titled TRANSFORMING METROLOGY DATA FROM A SEMICONDUCTOR TREATMENT SYSTEM USING MULTIVARIATE ANALYSIS, filed on Feb. 7, 2006, which is incorporated herein by reference in its entirety.

In one exemplary embodiment, a final weighting function is defined based on one or more of the initial weighting functions defined based on noise, accuracy, and sensitivity. In particular, one of the initial weighting functions can be selected as the final weighting function. Alternatively, two or more of the initial weighting functions can be combined to define the final weighting function.

Figure 12:
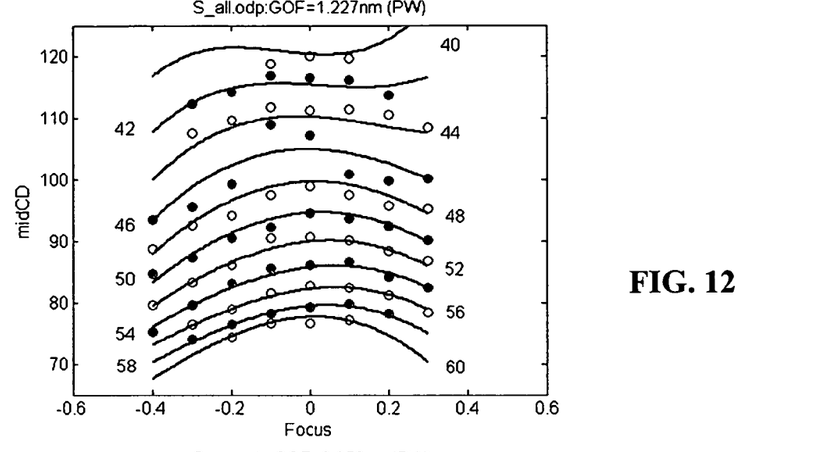
FIGS. 12, 13, 14 depict results of exemplary focus/exposure wafers (FEM) analysis.
Figure 13:
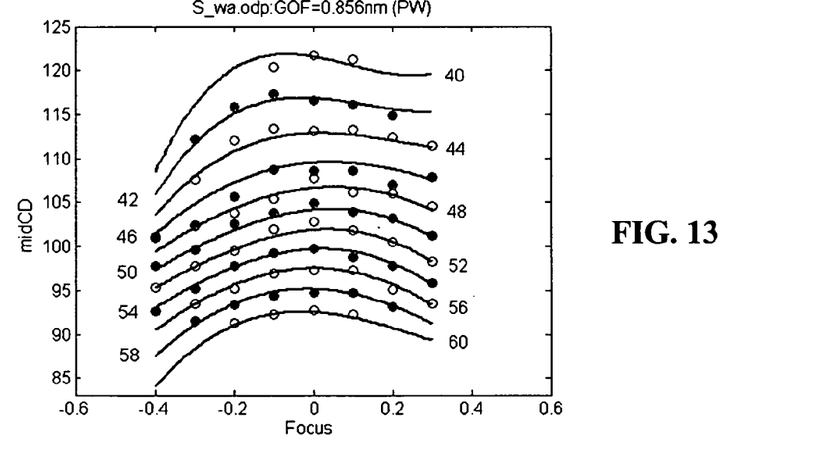
Figure 14:
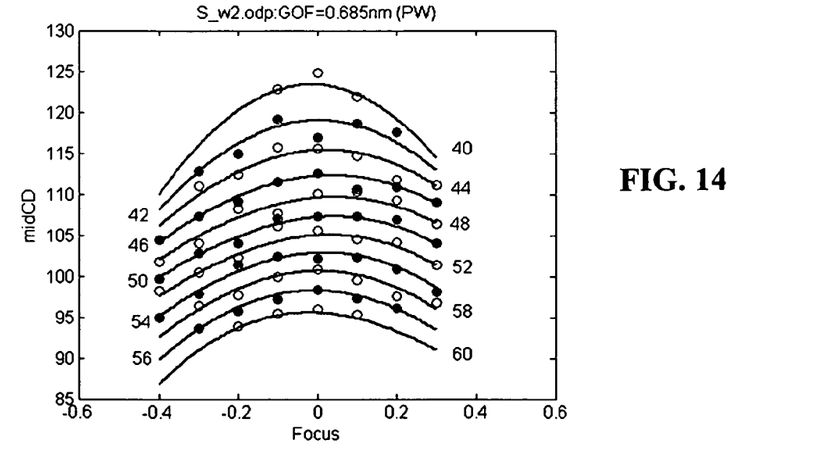

For example, focus/exposure wafers (FEM) are used to obtain intra-wafer CD variations. FIG. 12 depicts the results of an FEM analysis performed to determine middle critical dimension (CD) without using a weighting function. FIG. 13 depicts the results of the FEM analysis performed using weighting function wa. FIG. 14 depicts the results of the FEM analysis performed using weighting function wc. As can be seen from FIGS. 12, 13, and 14, weighting function wc results in greater sensitivity to changes in focus and dosage in determining CD.

Thus, based on the trend analysis described above, in the present example, weighting function wc is selected over weighting function wa. It should be recognized that various user requirements can be factored into selecting between different weighting functions. For example, some user's may select weighting function wa over wc because the reduction in sensitivity may be acceptable in order to obtain increased accuracy.

Although exemplary embodiments have been described, various modifications can be made without departing from the spirit and/or scope of the present invention. Therefore, the present invention should not be construed as being limited to the specific forms shown in the drawings and described above.

We claim:

1. A method of obtaining a weighting function to enhance measured diffraction signals used in optical metrology, the method comprising:
   obtaining a set of measured diffraction signals, wherein the set of measured diffraction signal was measured from a single site on a wafer using a photometric device;
   defining a first weighting function based on noise that exists in the measured diffraction signal, wherein defining the first weighting function comprises:
      generating a noise profile based on the set of measured diffraction signals;
      defining a noise envelope based on the noise profile; and
      defining the first weighting function based on the noise envelope;
   defining a second weighting function based on accuracy of the measured diffraction signal;
   defining a third weighting function based on sensitivity of the measured diffraction signal;
   defining a fourth weighting function based on one or more of the first, second, and third weighting functions; and
   generating an enhanced measured diffraction signal by multiplying another measured diffraction signal and a fifth weighting function, wherein the fifth weighting function is defined using the first weighting function, second weighting function, third weighting function, or fourth weighting function, and wherein the enhanced measured diffraction signal is used to determine a characteristic of a feature on a wafer using optical metrology.

2. The method of claim 1, wherein defining the first weighting function comprises:
   defining an initial weighting function as the inverse of the noise envelope; and
   modifying the initial weighting function to define the first weighting function.

3. The method of claim 2, wherein modifying the initial weighting function comprises:
   scaling the initial weighting function; and
   truncating the initial weighting function.

4. The method of claim 1, wherein generating a noise profile comprises:
   calculating an average measured diffraction signal for the set of measured diffraction signals;
   calculating a difference between each of the measured diffraction signal in the set of measured diffraction signals and the average measured diffraction signal, wherein the noise profile is the calculated difference divided by the average measured diffraction signal.

5. A method of obtaining a weighting function to enhance measured diffraction signals used in optical metrology, the method comprising:
   obtaining a measured diffraction signal, wherein the measured diffraction signal was measured from a site on a reference wafer using a photometric device, the reference wafer including a bare silicon layer;
   defining a first weighting function based on noise that exists in the measured diffraction signal;
   defining a second weighting function based on accuracy of the measured diffraction signal, wherein defining the second weighting function comprises:
      obtaining a simulated diffraction signal corresponding to the site on the reference wafer;
      comparing the measured diffraction signal and simulated diffraction signal;
      defining an error profile based on the comparison of the measured diffraction signal and simulated diffraction signal;
      defining an error envelope based on the error profile; and
      defining the second weighting function based on the error envelope;
   defining a third weighting function based on sensitivity of the measured diffraction signal;
   defining a fourth weighting function based on one or more of the first, second, and third weighting functions; and
   generating an enhanced measured diffraction signal by multiplying another measured diffraction signal and a fifth weighting function, wherein the fifth weighting function is defined using the first weighting function, second weighting function, third weighting function, or fourth weighting function, and wherein the enhanced measured diffraction signal is used to determine a characteristic of a feature on a wafer using optical metrology.

6. The method of claim 5, wherein the second weighting function is defined as the inverse of the error envelope.

7. A method of obtaining a weighting function to enhance measured diffraction signals used in optical metrology, the method comprising:
   obtaining a measured diffraction signal, wherein the measured diffraction signal was measured from a site on a wafer using a photometric device;
   defining a first weighting function based on noise that exists in the measured diffraction signal;

defining a second weighting function based on accuracy of the measured diffraction signal;
defining a third weighting function based on sensitivity of the measured diffraction signal, wherein defining the third weighting function comprises:
  obtaining a set of measured or simulated diffraction signals;
  determining one or more essential variables for the obtained set of measured or simulated diffraction signals using multivariate analysis; and
  transforming the obtained measured diffraction signal into a transformed diffraction signal using the one or more essential variables,
  wherein the third weighting function is defined based on the transformed diffraction signal and the measured diffraction signal;
defining a fourth weighting function based on one or more of the first, second, and third weighting functions; and
generating an enhanced measured diffraction signal by multiplying another measured diffraction signal and a fifth weighting function, wherein the fifth weighting function is defined using the first weighting function, second weighting function, third weighting function, or fourth weighting function, and wherein the enhanced measured diffraction signal is used to determine a characteristic of a feature on a wafer using optical metrology.

8. The method of claim 7, wherein the third weighting function is a ratio of the transformed diffraction signal and the measured diffraction signal.

9. A method of obtaining a weighting function to enhance measured diffraction signals used in optical metrology, the method comprising:
  obtaining a measured diffraction signal, wherein the measured diffraction signal was measured from a site on a wafer using a photometric device;
  defining a first weighting function based on noise that exists in the measured diffraction signal;
  defining a second weighting function based on accuracy of the measured diffraction signal;
  defining a third weighting function based on sensitivity of the measured diffraction signal;
  defining a fourth weighting function based on one or more of the first, second, and third weighting functions, wherein defining the fourth weight function comprises:
  performing a trend analysis using the first, second, and third weighting functions,
  wherein the fourth weighting function is defined based on the trend analysis; and
  generating an enhanced measured diffraction signal by multiplying another measured diffraction signal and a fifth weighting function, wherein the fifth weighting function is defined using the first weighting function, second weighting function, third weighting function, or fourth weighting function, and wherein the enhanced measured diffraction signal is used to determine a characteristic of a feature on a wafer using optical metrology.

10. The method of claim 9, wherein performing a trend analysis comprises:
  obtaining intra-wafer critical dimension variations of focus/exposure wafers using the first weighting function;
  obtaining intra wafer critical dimension variations of focus/exposure wafers using the second weighting function;
  obtaining intra wafer critical dimension variations of focus/exposure wafers using the third weighting function; and
  comparing results obtained in the intra-wafer critical dimension variations of focus/exposure wafers using the first, second, and third weighting functions.

11. The method of claim 9, wherein performing a trend analysis further comprises:
  obtaining intra-wafer critical dimension variations of focus/exposure wafers with silicon oxynitride layers using the first weighting function;
  obtaining intra wafer critical dimension variations of focus/exposure wafers with silicon oxynitride layers using the second weighting function;
  obtaining intra wafer critical dimension variations of focus/exposure wafer with silicon oxynitride layers using the third weighting function; and
  comparing results obtained in the intra-wafer critical dimension variations of focus/exposure wafers with silicon oxynitride layers using the first, second, and third weighting functions.

12. A method of using a weighting function to enhance measured diffraction signals used in optical metrology, the method comprising:
  obtaining a first measured diffraction signal measured from a feature on a wafer using a photometric device;
  multiplying the first measured diffraction signal and a weighting function to produce an enhanced measured diffraction signal,
  wherein the weighting function was defined based on noise, accuracy, and sensitivity of a second measured diffraction signal measured from another wafer, and wherein the second measured diffraction signal is a set of measured diffraction signals measured from a single site, and wherein the weighting function was defined by:
  generating a noise profile based on the set of measured diffraction signals;
  defining a noise envelope based on the noise profile; and
  defining the weighting function based on the noise envelope; and
  determining a characteristic of the feature using the enhanced measured diffraction signal.

13. A method of using a weighting function to enhance measured diffraction signals used in optical metrology, the method comprising:
  obtaining a first measured diffraction signal measured from a feature on a wafer using a photometric device;
  multiplying the first measured diffraction signal and a weighting function to produce an enhanced measured diffraction signal,
  wherein the weighting function was defined based on noise, accuracy, and sensitivity of a second measured diffraction signal measured from another wafer, and wherein the second measured diffraction signal was measured from a reference wafer, and wherein the weighting function was defined by:
  obtaining a simulated diffraction signal corresponding to the site on the reference wafer;
  comparing the second measured diffraction signal and simulated diffraction signal;
  defining an error profile based on the comparison of the second measured diffraction signal and simulated diffraction signal;
  defining an error envelope based on the error profile; and
  defining the weighting function based on the error envelope
  determining a characteristic of the feature using the enhanced measured diffraction signal.

14. A method of using a weighting function to enhance measured diffraction signals used in optical metrology, the method comprising:
- obtaining a first measured diffraction signal measured from a feature on a wafer using a photometric device;
- multiplying the first measured diffraction signal and a weighting function to produce an enhanced measured diffraction signal,
- wherein the weighting function was defined based on noise, accuracy, and sensitivity of a second measured diffraction signal measured from another wafer, and wherein the second measured diffraction signal was measured from a reference wafer, and wherein the weighting function was defined by:
  - obtaining a set of measured or simulated diffraction signals;
  - determining one or more essential variables for the obtained set of measured or simulated diffraction signals using multivariate analysis; and
  - transforming the obtained measured diffraction signal into a transformed diffraction signal using the one or more essential variables,
  - wherein the weighting function is defined based on the transformed diffraction signal and the measured diffraction signal; and
- determining a characteristic of the feature using the enhanced measured diffraction signal.

15. A method of using a weighting function to enhance measured diffraction signals used in optical metrology, the method comprising:
- obtaining a first measured diffraction signal measured from a feature on a wafer using a photometric device;
- multiplying the first measured diffraction signal and a weighting function to produce an enhanced measured diffraction signal,
- wherein the weighting function was defined based on noise, accuracy, and sensitivity of a second measured diffraction signal measured from another wafer, and wherein the second measured diffraction signal comprises a set of measured diffraction signals measured from a single site and a third measured diffraction signal measured from a reference wafer, and wherein the weighting function was defined by:
- generating a noise profile based on the set of measured diffraction signals;
- defining a noise envelope based on the noise profile;
- defining a first weighting function based on the noise envelope;
- obtaining a simulated diffraction signal corresponding to the site on the reference wafer;
- comparing the third measured diffraction signal and simulated diffraction signal;
- defining an error profile based on the comparison of the third measured diffraction signal and simulated diffraction signal;
- defining an error envelope based on the error profile;
- defining a second weighting function based on the error envelope;
- obtaining a set of measured or simulated diffraction signals;
- determining one or more essential variables for the obtained set of measured or simulated diffraction signals using multivariate analysis;
- transforming the set of measured diffraction signal into a set of transformed diffraction signals using the one or more essential variables,
- defining a third weighting function is defined based on one of the set of transformed diffraction signals and one of the set of measured diffraction signals,
- wherein the weighting function is defined based on one or more of the first, second, and third weighting functions; and
- determining a characteristic of the feature using the enhanced measured diffraction signal.

16. A computer-readable storage medium containing computer executable instructions for causing a computer to use a weighting function to enhance measured diffraction signals used in optical metrology, comprising instructions for:
- obtaining a first measured diffraction signal measured from a feature on a wafer;
- multiplying the first measured diffraction signal and a weighting function to produce an enhanced measured diffraction signal,
- wherein the weighting function was defined based on noise, accuracy, and sensitivity of a second measured diffraction signal measured from another wafer, and wherein the second measured diffraction signal is a set of measured diffraction signals measured from a single site, and wherein the weighting function was defined by:
  - generating a noise profile based on the set of measured diffraction signals;
  - defining a noise envelope based on the noise profile; and
  - defining the weighting function based on the noise envelope; and
- determining a characteristic of the feature using the enhanced measured diffraction signal.

17. A system to use a weighting function to enhance measured diffraction signals used in optical metrology, comprising:
- a photometric device to generate a first measured diffraction signal from a feature on a wafer; and
- a processor configured to multiply the first measured diffraction signal and a weighting function to produce an enhanced measured diffraction signal,
- wherein the weighting function was defined based on noise, accuracy, and sensitivity of a second measured diffraction signal measured from another wafer, and wherein the second measured diffraction signal is a set of measured diffraction signals measured from a single site, and wherein the weighting function was defined by:
  - generating a noise profile based on the set of measured diffraction signals;
  - defining a noise envelope based on the noise profile; and
  - defining the weighting function based on the noise envelope, and
- wherein the processor is configured to determine a characteristic of the feature using the enhanced measured diffraction signal.

18. A computer-readable storage medium containing computer executable instructions for causing a computer to obtain a weighting function to enhance measured diffraction signals used in optical metrology, comprising instructions for:
- obtaining a set of measured diffraction signals, wherein the set of measured diffraction signal was measured from a single site on a wafer using a photometric device;
- defining a first weighting function based on noise that exists in the measured diffraction signal, wherein defining the first weighting function comprises:
  - generating a noise profile based on the set of measured diffraction signals;
  - defining a noise envelope based on the noise profile; and
- defining the first weighting function based on the noise envelope;

defining a second weighting function based on accuracy of the measured diffraction signal;

defining a third weighting function based on sensitivity of the measured diffraction signal;

defining a fourth weighting function based on one or more of the first, second, and third weighting functions; and generating an enhanced measured diffraction signal by multiplying another measured diffraction signal and a fifth weighting function, wherein the fifth weighting function is defined using the first weighting function, second weighting function, third weighting function, or fourth weighting function, and wherein the enhanced measured diffraction signal is used to determine a characteristic of a feature on a wafer using optical metrology.

* * * * *